United States Patent [19]

Mitsuda

[11] Patent Number: 4,517,260

[45] Date of Patent: May 14, 1985

[54] SINGLE COMPONENT CELL FOR PHOSPHORIC ACID TYPE FUEL CELL

[75] Inventor: Kenro Mitsuda, Takatsuki, Japan

[73] Assignee: Mitsubishi Denki Kabushiki Kaisha, Tokyo, Japan

[21] Appl. No.: 607,211

[22] Filed: May 4, 1984

[30] Foreign Application Priority Data

May 17, 1983 [JP] Japan ................................. 58-87873

[51] Int. Cl.³ .............................................. H01M 8/02
[52] U.S. Cl. ........................................................ 429/41
[58] Field of Search ................................. 429/41, 33

[56] References Cited

U.S. PATENT DOCUMENTS

| | | | |
|---|---|---|---|
| 3,497,389 | 2/1970 | Berger et al. | 429/33 |
| 4,262,063 | 4/1981 | Kudo et al. | 429/41 |
| 4,352,865 | 10/1982 | DiPasquale | 429/41 |

Primary Examiner—Donald L. Walton
Attorney, Agent, or Firm—Oblon, Fisher, Spivak, McClelland & Maier

[57] ABSTRACT

A single component cell for a phosphoric acid type fuel cell, constructed with a matrix base which consists principally of phosphoric-acid-resistant inorganic substance powder, and a buffer layer which is principally composed of zirconium phosphate and interposed between catalyst layers of fuel electrode and oxidant electrode, so as to prevent the catalyst layers from being damaged by the matrix base.

5 Claims, 4 Drawing Figures

4,517,260

SINGLE COMPONENT CELL FOR PHOSPHORIC ACID TYPE FUEL CELL

BACKGROUND OF THE INVENTION

1. Field of the Invention

The present invention relates to a single component cell for a phosphoric acid type fuel cell using phosphoric acid as the electrolyte. More particularly, the invention is concerned with a construction of such single component cell.

2. Description of Prior Art

As has been well known, the phosphoric acid type fuel cell has an electrolyte matrix containing therein phosphoric acid as the electrolyte interposed between a fuel electrode (anode) and an oxidant electrode (cathode), both being disposed in mutual confrontation. The fuel cell is operated by feeding fuel gas and oxidant gas to the fuel electrode and the oxidant electrode, respectively. Here, the matrix for holding electrolyte, i.e., the matrix base is one of the important constituent elements for improving the cell characteristics and securing stability pf the cell operations over a long period of time. As the matrix base which is now in use, there is generally such one that is formed of an inorganic substance powder and a phosphoric-acid-resistant binding agent. However, in order for the fuel cell to sufficiently exhibit its characteristics and maintain its stable operating conditions, the matrix base should satisfy the conditions to be enumerated in the following:

(1) It is stable both thermally and chemically during operations (approximately 40,000 hours) of the phosphoric acid type fuel cell under its operating conditions of 200° C. or so in 95 to 100% $H_3PO_4$;
(2) It is electron-insulating;
(3) It has wettability with the electrolyte;
(4) It has sufficient bubble pressure to prevent both fuel gas and oxidant gas from crossing over each other through the electrolyte matrix;
(5) It has the thinnest possible as well as uniform thickness;
(6) It has relatively uniform particle size of from 1 to 5 microns to satisfy the conditions in the foregoing items (3) and (4); and
(7) It is available at a low cost.

Of the abovementioned conditions, the items (1) and (2) are the most important. Also, the condition in the item (5) is of importance in improving the cell characteristics; that is, the thinner the matrix base is, the lower becomes the internal resistance of the cell, with the consequence that the cell improves its characteristics. However, if the matrix base is too thin, sufficient bubble pressure can not be obtained with the consequence that the cross-over takes place between the fuel gas and the oxidant gas, and the condition in the item (4) can no longer be fulfilled, whereby the cell characteristics lowers conversely. While there exists a range of the optimum thickness for the matrix base, it is largely governed by the particle diameter of the powder material for use as the matrix base.

As the matrix base, there has so far been known one prepared by mixing a fluorine-containing resin as a binder with silicon carbide powder. In general, silicon carbide is widely used as an abrasives, and is available in uniform particle size and at a low cost. The compound has wettability with phosphoric acid. Accordingly, the substance meets the foregoing conditions in the items (3), (6), and (7). Further, the conditions in the items (4) and (5) can be met by selection of appropriate conditions for the forming method of the matrix base and the particle size of silicon carbide powder. However, inasmuch as these two conditions in the items (4) and (5) are contradictory each other as to thickness of the matrix base, it is difficult to satisfy both conditions simultaneously to the full extent. As for the condition in the item (1), silicon carbide does not always meet it, but the substance is eroded by phosphoric acid, though gradually. Furthermore, as to the condition in the item (2), silicon carbide belongs to semiconductive substance, so that it cannot be said to be a perfect insulating substance. Concerning these two conditions in the items (1) and (2), diamond which is excellent in chemical stability and belongs to the perfect insulating substance best meets the two conditions. Unfortunately, however, it is difficult at present to obtain this substance at a low cost and in a large quantity. Moreover, of those various oxides which also belong to the insulating substance, tantalum pentoxide and niobium oxide are excellent in the chemical stability, but these two substances are also difficult to obtain at a low cost as is the case with diamond. Boron carbide is also excellent in the chemical stability, but does not satisfy the condition in the item (2). As mentioned above, of various inorganic substances, silicon carbide is the most used material, at present, for the matrix base, although it still has some inferior quality not to the point of meeting the aforelisted requirements for the matrix base.

In spite of the above, however, the matrix bases constituted of powder of various inorganic substances have gross disadvantage common to them all. That is to say, fine paraticles of inorganic substance forming the matrix base leave scars on the surface of the catalyst layer of the fuel cell during its operation, on account of which various mal-effects take place such that cracks are formed in the catalyst layer to cause the crossover between the fuel gas and the oxidant gas to lower the cell characteristics, and so forth. These phenomena will be explained in more detail in reference to the accompanying drawing.

FIG. 1a is a cross-sectional view showing a conventional single component cell. In the drawing, a reference numeral 1 designates an oxidant electrode, a numeral 2 refers to a catalyst layer for the oxidant electrode, a numeral 3 represents a matrix base made of an inorganic substance powder as the principal constituent, and for holding phosphoric acid as the elecrolyte, a numeral 4 denotes a catalyst layer for the fuel electrode, and 5 refers to the fuel electrode.

FIG. 1b is a cross-sectional view in part and in an exaggerated scale showing a state of the interface between the catalyst layer 2 for the oxidant electrode 1 and the matrix base 3. In the drawing, a reference numeral 6 designates inorganic substance powder which is the constituent element for the matrix base 3, and a numeral 7 refers to cracks occurred in the catalyst layer 2 caused by the inorganic substance power 6. The same can be said of the interface between the catalyst layer 4 for the fuel electrode 5 and the matrix base 3.

Thus, damages caused to the catalyst layers 2 and 4 by the inorganic substance powder 6 is considered to take place when the cell is going to be operated by applying a surface pressure onto it. By such damage, the catalyst layers 2 and 4 can no longer be operated normally, and, moreover, there are induced various undesirable phenomena such that the cross-over takes place between the fuel gas and the oxidant gas, the catalyst layers 2 and 4 are excessively wetted with phosphoric acid, and others, hence the cell characteristics become low. particularly, in the case of silicon carbide powder, the particles of substance are produced not by synthesis, but by mechanical comminution, so that the particles have many angular, non-round corners which are liable to impair the catalyst layers 2 and 4.

As has been explained so far, the single component cell constructed with the matrix base made of the inorganic substance powder 6 has the basic and common disadvantage of causing damage to the catalyst layers 2 and 4 due to the inorganic substance powder 6.

SUMMARY OF THE INVENTION

The present invention has been made with a view to removing the disadvantages inherent in the conventional fuel cell, and aims at providing an improved single component cell for a phosphoric acid type fuel cell having high cell function and being capable of preventing the catalyst layers from damage to be caused by the inorganic substance powder.

According to the present invention, in general aspect of it, there is provided a single component cell for a phosphoric acid type fuel cell, which comprises: an oxidant electrode and a fuel electrode, each having a catalyst layer; a matrix base interposed between said catalyst layers of said both electrodes, and consisting principally of phosphoric-acid-resistant inorganic substance powder; and a buffer layer consisting principally of zirconium phosphate, and interposed between said matrix base and at least one of said catalyst layers for said both electrodes.

The foregoing object, other objects as well as specific construction of the single component cell for the phosphoric acid type fuel cell, and component elements used in each constituent layer of it according to the present invention will become more apparent and understandable from the following detailed description thereof, when read in conjunction with the accompanying drawing.

BRIEF DESCRIPTION OF THE ACCOMPANYING DRAWING

In the drawing

FIG. 1b is a cross-sectional view in an exaggerated scale showing a state of the interface between the catalyst layer and the matrix base shown in FIG. 1a;

FIG. 2b is a cross-sectional view in an exaggerated form showing a state of the buffer layer interposed between the catalyst layer and the matrix base shown in FIG. 2a.

In the following, the present invention will be explained in specific details with reference to one preferred embodiment thereof shown in the accompanying drawing.

Figure 1A:
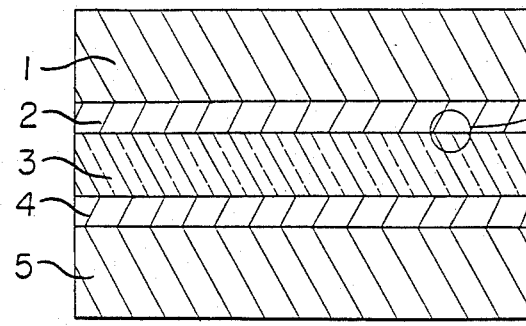
FIG. 1a is a cross-sectional view showing a conventional single component cell.
Figure 1B:
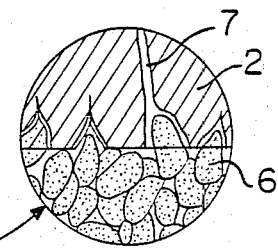
Figure 2A:
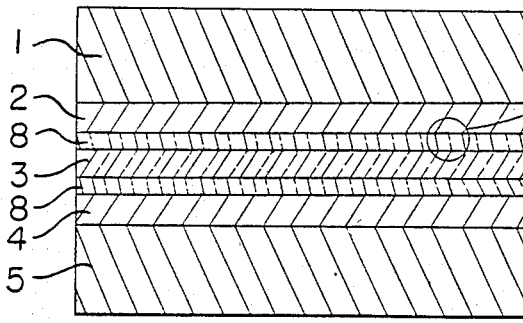
FIG. 2a is a cross-sectional view showing a single component cell according to a preferred embodiment of the present invention.

FIG. 2a is a cross-sectional view showing a single component cell for the phosphoric acid type fuel cell according to one preferred embodiment of the present invention, in which a reference numeral 8 is a buffer layer consisting principally of zirconium phosphate. More specifically, the buffer layer is made up of a mixture of zirconium phosphate powder and phosphoric-acid-resistant binder.

As the phosphoric-acid-resistant binder, there may be enumerated fluorine-containing resin, polyimide resin, and phenolic resin. Zirconium phosphate is a layered compound represented by the following chemical formula: $Zr(HPO_4)_2.H_2O$ ($\alpha$ type) and $Zr(HPO_4)_2.2H_2O$ ($\gamma$ type). The compound itself is an ion conductor and electron insulator, hence attempt has been under way as to using the compound as a solid electrolyte. Also, zirconium phosphate changes into gel in phosphoric acid at a temperature of 200° C. or so, but does not swell, has excellent chemicals resistant property, and is insoluble in water. These properties of zirconium phosphate are the most suitable as the constituent material for the buffer layer 8.

Figure 2B:
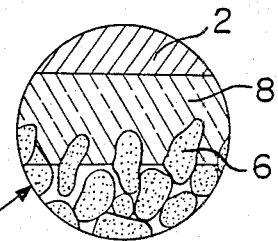

FIG. 2b is a cross-sectional view in an exaggerated form showing a state of the buffer layer 8 interposed between the catalyst layer 2 of the oxidant electrode 1 and the matrix base 3. As seen from this drawing, zirconium phosphate absorbs the surface irregularities of the inorganic substance powder 6 by its being gelled and moved, thereby preventing the catalyst layer 2 from being impaired by the inorganic substance powder. Further, since zirconium phosphate also absorbs the surface irregularities of the catalyst layer 2, even when cracks occur in the catalyst layer 2 for some reason or others, the gelled zirconium phosphate fills in the cracks to prevent in advance the undesirable phenomenon such as cross-over, and others from taking place. It is to be noted that zirconium phosphate has less fluidity and larger bubble pressure than phosphoric acid. Accordingly the condition in the item (4) above is relaxed. Furthermore, since zirconium phosphate itself is an electron insulator, the condition in the item (2) is relaxed. As the consequence of this, those inorganic substances in powder form such as boron carbide which could not be employed owing to its electron conductivity becomes able to be used as the matrix base 3. In addition, non-uniformity in thickness of the matrix base 3, to some extent, can be sufficiently compensated by the buffer layer 8 of zirconium phosphate, hence the condition in the item 5 above can be relaxed. Moreover, in view of satisfactory wetting property of zirconium phosphate with phosphoric acid, the condition in the item (3) can be more relaxed than ever.

Heretofore, there have been various methods for forming the matrix base 3 such as, for example, printing method, curtain method, tape casting method, spraying method, rolling method, doctor blade method, and others. The buffer layer 8 consisting principally of zirconium phosphate can be simply formed by any of the above-mentioned methods.

As for thickness of the buffer layer 8, it is preferable to have it below 100 $\mu$m, or preferably 50 $\mu$m or so. When the buffer layer is too thick, the internal resistance increases, and when it is too thin, the function of the buffer layer 8 becomes poor.

As to the matrix base 3 composed principally of inorganic substance powder, there has been used so far the one having its thickness of 100 to 200 $\mu$m or so. However, since the conditions in the items (2) to (5) above have been relaxed by the interposition of the buffer layer 8 as mentioned above, the matrix base according to the present invention could possibly be made as thin as, for example, 50 $\mu$m or so.

As the inorganic substance powder to be the principal constituent of the matrix base 3, there may be exemplified, besides silicon carbide and boron carbide, powder of diamond, tantalum pentoxide, niobium oxide, silicon nitride, and so forth. The matrix base is constructed with any one of these substances or a mixture of a plurality of these materials.

In the above-described example according to the present invention, the buffer layer 8 composed principally of zirconium phosphate is interposed between the matrix base 3 and the catalyst layers 2 and 4 of the respective oxidant and fuel electrodes. It should however be noted that the buffer layer can be interposed between the matrix base and either of the catalyst layers for the electrodes.

As mentioned in the foregoing, since the single component cell for the phosphoric acid type fuel cell according to the present invention is constructed by an oxidant electrode and a fuel electrode, each having a catalyst layer; a matrix base interposed between the catalyst layers of both electrodes, and consisting principally of phosphoric-acid-resistant inorganic substance powder; and a buffer layer consisting principally of zirconium phosphate, and interposed between the matrix base and at least one of the catalyst layers for both electrodes, any damage to the catalyst layer due to the inorganic substance powder can be prevented, whereby the single component cell for the phosphoric acid type fuel cell of higher function can be effectively obtained.

Although, in the foregoing, the present invention has been described with specific reference to a preferred embodiment thereof, it should be noted that the invention is not limited to this embodiment alone, but any changes and modifications may be made by those persons skilled in the art within the spirit and scope of the invention as recited in the appended claims.

What is claimed is:
1. A single component cell for a phosphoric acid type fuel cell, which comprises in combination:
   (a) an oxidant electrode and a fuel electrode, each having a catalyst layer;
   (b) a matrix base interposed between the catalyst layers of said both electrodes, and consisting principally of phosphoric-acid-resistant inorganic substance powder; and
   (c) a buffer layer consisting principally of zirconium phosphate, and interposed between said matrix base and at least one of said catalyst layers for said both electrodes.
2. The single component cell for a phosphoric acid type fuel cell according to claim 1, wherein thickness of the matrix base is in a range of from 50 to 200 $\mu$m, and thickness of the buffer layers is made less than 100 $\mu$m.
3. The single component cell for a phosphoric acid type fuel cell according to claim 1, wherein the phosphoric-acid-resistant inorganic substance powder is one kind selected from the group consisting of silicon carbide, diamond, tantalum pentoxide, niobium oxide, silicon nitride, and boron carbide, or a mixture of said compounds.
4. The single component cell for a phosphoric acid type fuel cell according to claim 1, wherein the buffer layer is constructed with a mixture of zirconium phosphate powder and a phosphoric-acid-resistant binder.
5. The single component cell for a phosphoric acid type fuel cell according to claim 4, wherein said phosphoric-acid-resistant binder is one selected from the group consisting of fluorine-containing resin, polyimide resin, and phenolic resin.

* * * * *